United States Patent
Kuroda et al.

(10) Patent No.: US 6,230,450 B1
(45) Date of Patent: May 15, 2001

(54) DAMPING TOP, DAMPING ROD, AND DAMPING DEVICE USING SAME

(75) Inventors: Eiji Kuroda; Fumiaki Arima; Tamotsu Hata; Hideo Kimijima, all of Tokyo (JP)

(73) Assignee: Sumitomo Construction Co., Ltd., Tokyo (JP)

( * ) Notice: Subject to any disclaimer, the term of this patent is extended or adjusted under 35 U.S.C. 154(b) by 0 days.

(21) Appl. No.: 09/331,782

(22) PCT Filed: Dec. 25, 1997

(86) PCT No.: PCT/JP97/04861

§ 371 Date: Oct. 25, 1999

§ 102(e) Date: Oct. 25, 1999

(87) PCT Pub. No.: WO98/29625

PCT Pub. Date: Jul. 9, 1998

(30) Foreign Application Priority Data

Dec. 27, 1996 (JP) ................................................. 8-351579
Dec. 27, 1996 (JP) ................................................. 8-351580

(51) Int. Cl.[7] ............................................... E04B 1/98
(52) U.S. Cl. ........................ 52/167.8; 52/167.1; 188/322.5
(58) Field of Search .................................. 52/167.8, 167.1; 188/266, 267.1, 267.2, 322.5

(56) References Cited

U.S. PATENT DOCUMENTS

| | | | |
|---|---|---|---|
| 2,856,179 | * 10/1958 | Hogan | 188/322.5 |
| 4,200,003 | * 4/1980 | Miller | 188/322.5 |
| 4,576,252 | * 3/1986 | Omata | 188/322.5 |
| 4,759,534 | * 7/1988 | Hartel | 188/267.1 |
| 5,090,531 | * 2/1992 | Carlson | 188/267.1 |
| 5,286,013 | * 2/1994 | Seymour et al. | 188/322.5 |
| 5,460,252 | * 10/1995 | Kosugi et al. | 188/322.5 |
| 5,992,582 | * 11/1999 | Lou et al. | 188/267.1 |
| 6,141,919 | * 11/2000 | Robinson | 52/167.8 |

FOREIGN PATENT DOCUMENTS

| | | | |
|---|---|---|---|
| 1268938 | * 10/1989 | (JP) | 52/167.8 |
| 1268939 | * 10/1989 | (JP) | 52/167.8 |

* cited by examiner

*Primary Examiner*—Carl D. Friedman
*Assistant Examiner*—Dennis L. Dorsey
(74) *Attorney, Agent, or Firm*—Rosenthal & Osha L.L.P.

(57) ABSTRACT

A damping top which comprises first and second L1 connection members (10, 20) connected to each other so as to connect two relatively displacing points (objects) (L1, L2) to each other, which connection members are fixed at one end thereof to the two points (L1, L2), respectively. The first connection member (10) is formed at its connection side with a guide screw portion (10a), on which is rotatably and slidably mounted a rotating top (integral rotating unit) (16) adapted to be driven by a guide nut (14) threaded onto the screw portion through a ball bearing (12). The second connection member (20) is formed at its connection side in a casing (24) for a chamber (22), which receives therein the rotating top (16), and a damping viscous body (26) is filled in the chamber (22). Thus it is possible to provide a damping device which is simple and small-sized, and provides great damping effects.

19 Claims, 16 Drawing Sheets

US 6,230,450 B1

DAMPING TOP, DAMPING ROD, AND DAMPING DEVICE USING SAME

TECHNICAL FIELD

The present invention relates to a damping top (damping mechanism), a damping rod and damping devices using the same which have simple structures and small sizes and also are capable of providing great damping effects.

BACKGROUND OF THE ART

In general, the damping mechanism is provided between two points (objects) relatively displacing to each other, so that a vibration energy to be transferred from one vibration source side to other damping object side is converted into a thermal energy for causing the vibration energy to disappear, thereby achieving the damping effects.

The above mentioned damping mechanism is so structured that parts relatively displacing to each other by vibration are accommodated in a chamber including a viscous material, which is formed in the device, whereby the damping effect is achieved through its viscous and frictional resistance, and further in this case so structured that an amount of displacement of the above mentioned relatively displacing parts is amplified by an amplification means from an actual displacement amount (a displacement amount of two points relatively displacing), whereby the damping effect is thus increased. By the way, the damping effect is proportional to a confronting area to the first power between the two parts relatively displacing (operating to each other) and also to a relative speed to alpha power.

The above mentioned conventional damping mechanism, however, has difficulties to be described below. As described above, the conventional damping mechanism, in general, has means for amplifying the relatively displacing parts, wherein this displacement amplifying means normally comprises a leverage means connected thereto by a hinge-joint. Such the hinge-leverage means is, however, insufficient in amplifying magnification (rate in increase of the confronting area of the relatively displacing parts and the relative speed between them) and also is complicated in structure, whereby the structure is enlarged and accuracy in operation is also dropped.

Accordingly, an object of the present invention is to provide a displacement-amplifying means having a simple and compact structure and being capable of achieving a large amplifying magnification, namely provide a damping device having a simple and compact structure and being capable of achieving a large damping effect.

DISCLOSURE OF THE INVENTION

In order to achieve the above object, a first damping device (damping top) in accordance with the present invention comprises: first and second connective members so connected with each other as to be relatively displaceable; the first connective member further comprising a first rod formed with a guide screw in its connecting side, a guide nut engaged with the guide screw and axially supported so as to rotate and slide on the guide screw on the basis of a relative displacement from the guide screw, and a disk-shaped rotational body having a sufficiently larger diameter than the first rod and being rotatably and slidably attached thereto through the guide nut; the second connective member further comprising a second rod, and a cylindrically shaped casing formed in its connecting side for accommodating the rotational body and the guide nut, and the damping device is characterized in that a viscous material and/or a viscoelastic material is filled for damping in a gap defined between an inner wall of the cylindrically shaped casing and the rotational body.

The rotational body may so unitary be formed as to extend radially and outwardly from a circumference of the guide nut, or may be provided at a position distanced in an axial direction from the guide nut and also is so formed as to be engaged with one side of the guide nut.

The damping device may be provided between diagonally opposite corners of a frame structure in a building construction, or may be provided between precast members and/or fair-faced constructions in a fair-faced building construction including precasts of concrete, or may be provided between a foundation of a building construction and a fair-faced floor slab, wherein the damping device connects isolated floors through a precast steel extending throughout the isolated floors and also extending along an outermost vertical column of the building which consisting of a plurality of floors.

The second damping device in accordance with the present invention comprises: first and second connective members so connected with each other as to be relatively displaceable; the first connective member further comprising an inner tube formed with a guide screw in its connecting side, and a disk-shaped rotational body engaged with the guide screw and having a sufficiently larger diameter than the inner tube and being attached thereto rotatably and slidably on the basis of a relative displacement from the guide screw; the second connective member further comprising an outer tube, and a cylindrically shaped casing formed in its connecting side for accommodating the rotational body, and the damping device is characterized in that a viscous material and/or a viscoelastic material is filled for damping in a gap defined between an inner wall of the cylindrically shaped casing and the rotational body.

The rotational body may preferably comprise a disk-shaped body and a brimmed part being thinner than the disk-shaped body and extending radially and outwardly from a circumference of the disk-shaped body. The damping device may preferably be so provided as to connect isolated floors through a precast steel extending throughout the isolated floors and also extending along an outermost vertical column of the building which consisting of a plurality of floors.

A damping rod in accordance with the present invention may comprise; first and second connective members so connected with each other as to be relatively displaceable; the first connective member further comprising a first rod formed with a guide screw at least in its connecting side, a guide nut engaged with the guide screw and axially supported so as to rotate and slide on the guide screw on the basis of a relative displacement from the guide screw, and a cylindrically shaped rotational body having a sufficiently larger diameter than the first rod and having a sufficiently larger length in anal direction than a diameter itself and further being rotatably and slidably attached thereto through the guide nut; the second connective member further comprising a cylindrically shaped casing formed in its connecting side for accommodating the cylindrically shaped rotational body and the guide nut, and the damping device is characterized in that a viscous material and/or a viscoelastic material is filled for damping in a gap defined between an inner wall of the cylindrically shaped casing and the cylindrically shaped rotational body.

In this case, the cylindrically shaped rotational body may comprise a cylinder having one end into which the guide nut is inserted and an opposite closed end, wherein one side of the guide nut and the opposite closed end of the are rotatably and axially supported. The cylindrically shaped rotational body may also comprise a tube-like rotational body having one end into which the guide nut is inserted and an opposite opened end, wherein opposite sides of the guide nut are rotatably and axially supported and further the viscous material and/or the viscoelastic material is also filled into a hollow portion of the tube-like rotational body.

The damping device may be provided between diagonally opposite corners of a frame structure in a building construction, so that the damping device is allowed to be compressed and tensed, or may be provided between a foundation and a vibration-isolating construction on the foundation, so that the damping device is allowed to be compressed and tensed.

In the first damping device in accordance with the present invention, the displacement amplifying means comprises a rotational body or a rotational top driven or rotated slidably by the guide nut engaged with the guide screw of the first connective member, for which reason the relative speed increasing rate, "N" is given by the following equation.

$$N=2\pi r/p$$

where "p" is the pitch of the nut and the guide screw, and "r" is the representative radius of the rotational top, whereby the relative speed increasing rate "N" is selected sufficiently large by setting proper values for "p" and "r". Assuming that "p" and "r" are set 2 cm and 5 cm respectively, "N" is amplified by 15.7 times. In this case, if the damping top is used to the bracing, then "N" is further amplified by 22.2 times. The confronting area "A" is also selected sufficiently large by setting proper values for "p" and "r". The effect of the above damping top provided by those will be described in the embodiments as mentioned below. This displacement amplification means comprises the screw-nut mechanism which may be simple and compact-size.

The damping device using the second damping top in accordance with the present invention has superior characteristics and may be structured simply and compactly and also may exhibit sufficient damping effect, similarly to the above first damping top. Accordingly, the first and second damping devices in accordance with the present invention have the simple and compact structure and are capable of exhibit large damping effects.

In the damping device (damping rod) in accordance with the present invention, the displacement amplifying means comprises a rotational inner cylinder driven or rotated slidably by the guide nut engaged with the guide screw of the first connective member, for which reason the relative speed increasing rate "N" is given by the following equation.

$$N=\pi D/p$$

where "p" is the pitch of the nut and the guide screw, and "D" is the diameter of the rotational inner cylinder, whereby the relative speed increasing rate "N" is selected sufficiently large by setting proper values for "p" and "D". Assuming that "p" and "D" are set 2 cm and 10 cm respectively, "N" is amplified by 15.7 times. In this case, if the damping top is used to the bracing, then "N" is further amplified by 22.2 times. The confronting area "A" is also selected sufficiently large by setting proper values for the above diameter "D" and a length "L" of the rotational inner cylinder. The effect of the above damping rod provided by those will be described in the embodiments as mentioned below. This displacement amplification means comprises the screw-nut mechanism which may be simple and compact-size. Namely, the damping device in accordance with the present invention have the simple and compact structure and are capable of exhibit large damping effects.

BRIEF DESCRIPTIONS OF THE DRAWINGS

Figure 21:
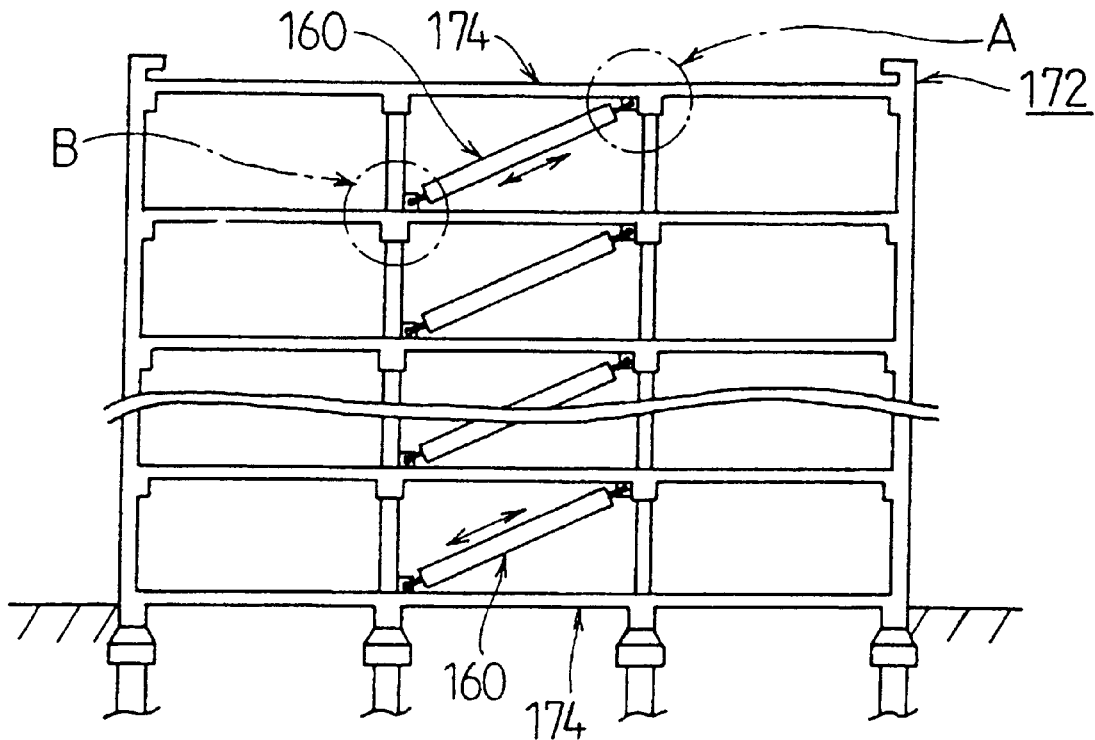

FIG. 21 whole sectional view illustrative of a building construction, wherein a damping device (damping rod) in accordance with the present invention is applied between diagonally opposite corners of the frame structure of the building construction.

Figure 22:
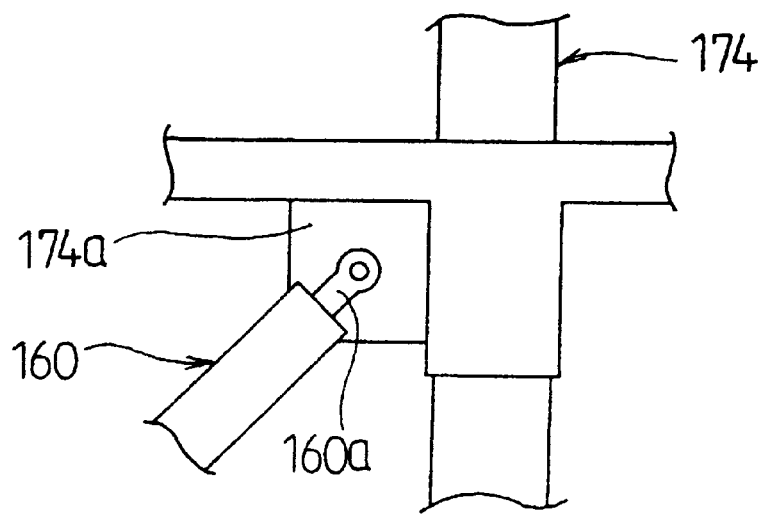

FIG. 22 is an enlarged view at an "A" portion of FIG. 21.

Figure 23:
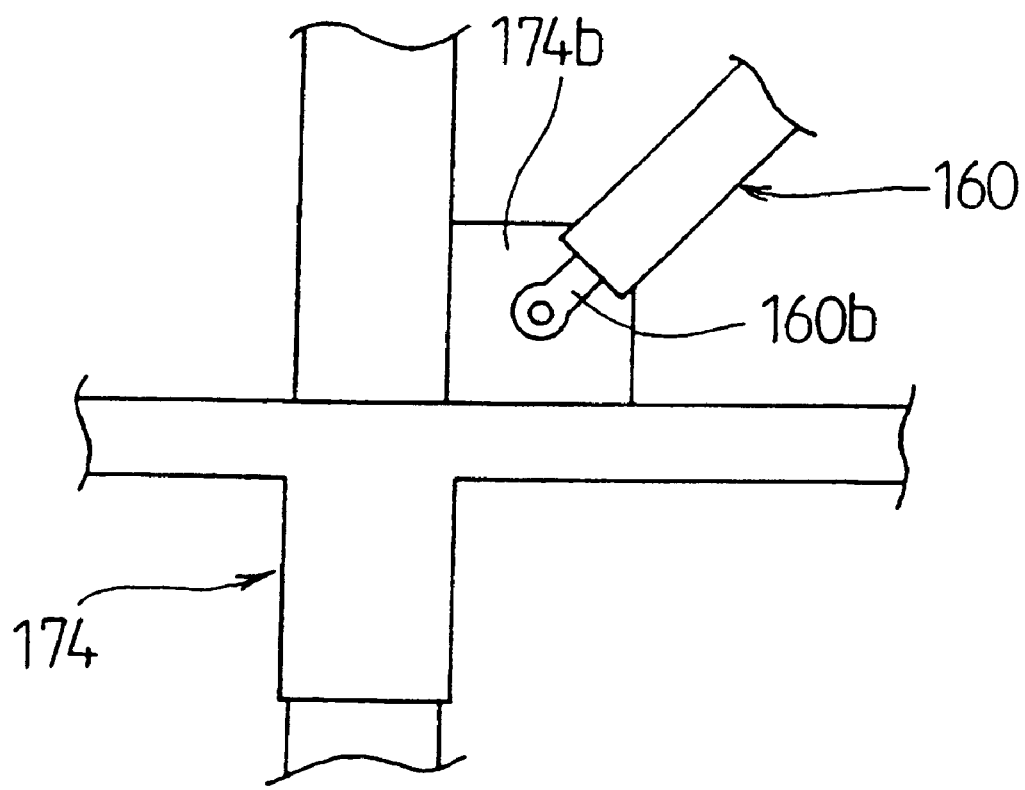

FIG. 23 is an enlarged view at a "B" portion of FIG. 21.

Figure 24:
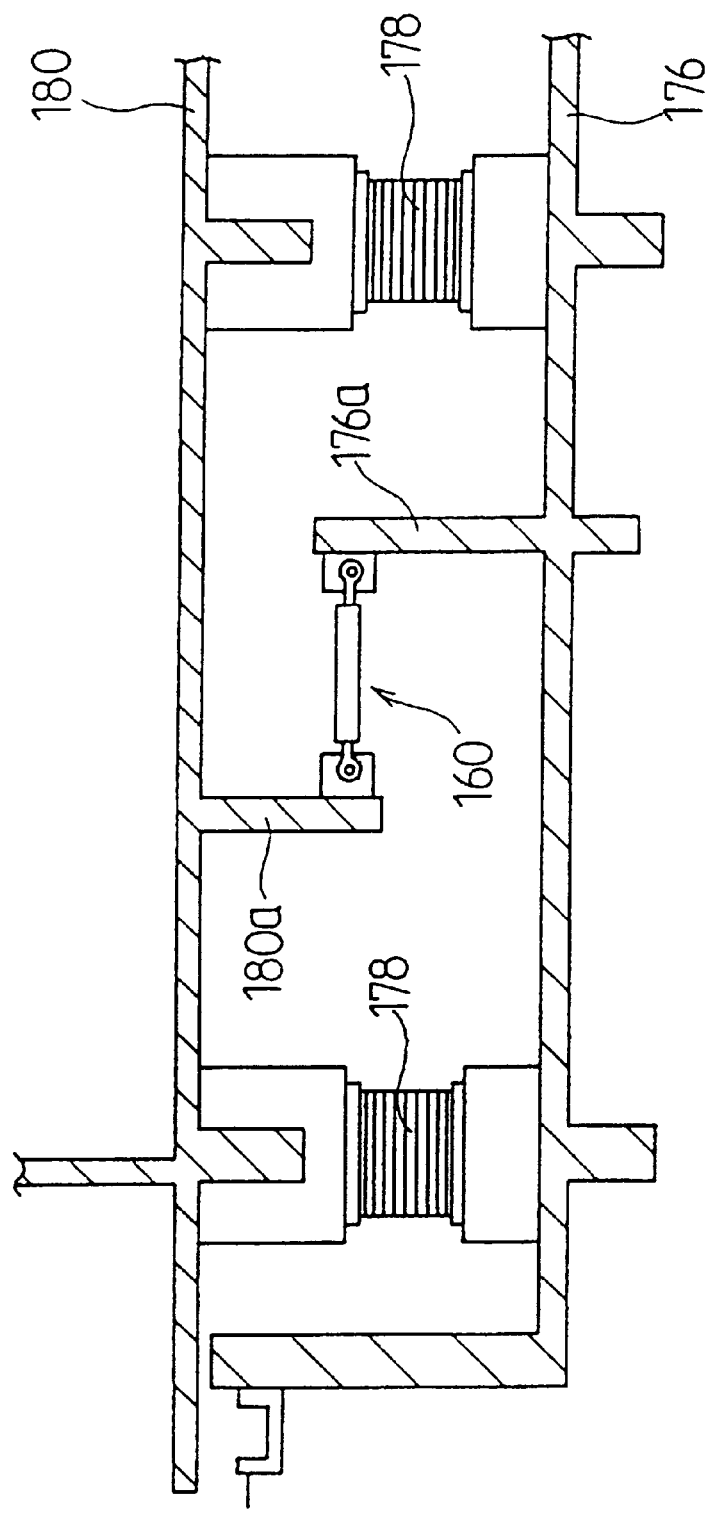

FIG. 24 is a whole perspective view of illustrative of a foundation and a vibration isolation construction, wherein a damping device in accordance with the present invention is used between the foundation and the vibration isolation construction over this foundation.

Figure 25:
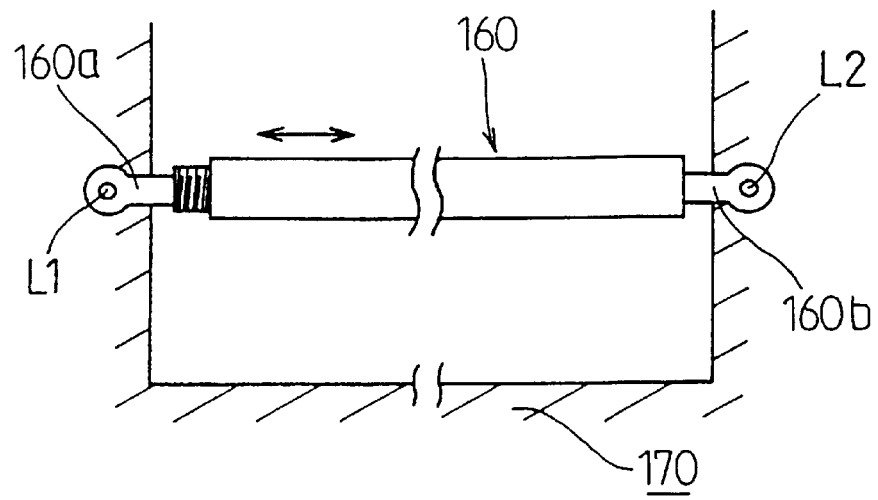

FIG. 25 is a schematic view of illustrative of a damping rod erected between two points in the building construction.

Figure 26:
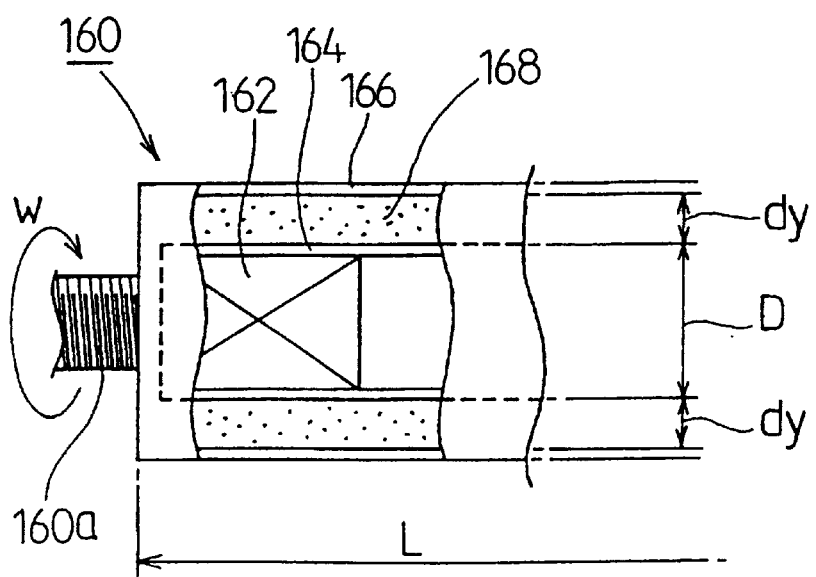

FIG. 26 is a fragmentary cross sectional view in FIG. 25.

BEST MODES FOR CARRYING OUT THE INVENTION

Figure 1:
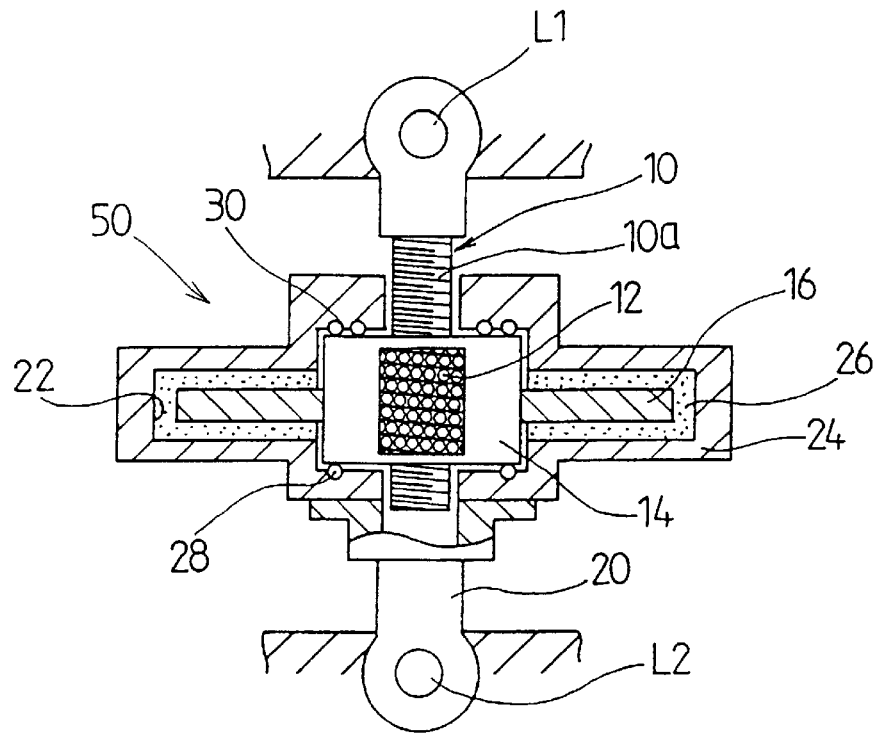
FIG. 1 is a cross sectional view illustrative of a damping device having a damping top in one embodiment in accordance with the present invention.

The damping top of the first embodiment in accordance with the present invention will hereinafter be described with reverence to the attached drawings. In FIG. 1, the damping device in accordance with the present invention may basically comprise first and second connective members so coupled with each other as to connect two points (objects) L1 and l2 relatively displacing from one another. Namely, the damping device comprises a first rod 10 and a tube-shaped second rod 20. Those rods 10 and 20 are connected through those ends to the two points L1 and L2 respectively. The first rod 10 has a connective part formed of a screw portion 10a to which a guide nut 14 is engaged through ball bearings 12, and a rotational top 16 is attached to the guide nut 14 so that the rotational top 16 is rotatable and slideable over the screw portion 10a. The second rod 20 is formed in its connecting side with a casing 24 defining a chamber 22 which accommodates the above rotational top 16, so that a damping viscous material and/or viscoelastic material 26 is filled in this chamber 22.

The guide nut 14 is provided with ball bearings 28 and 30 on its top and bottom faces adjacent to the casing 24 which surrounds the guide nut 14, whereby the guide nut 14 is axially supported so as to rotate on the guide screw portion 10a and slides in top and down directions in response to both compressive and tensile loads generated by a relative displacement between the two points L1 and L2. The rotational top 16 comprises a unitary rotor 16 extending outwardly in radial directions from a circumference of the guide nut 14. Synthesized rubbers such as polyisobutylene way preferably be used as viscous fluid.

Figure 17:
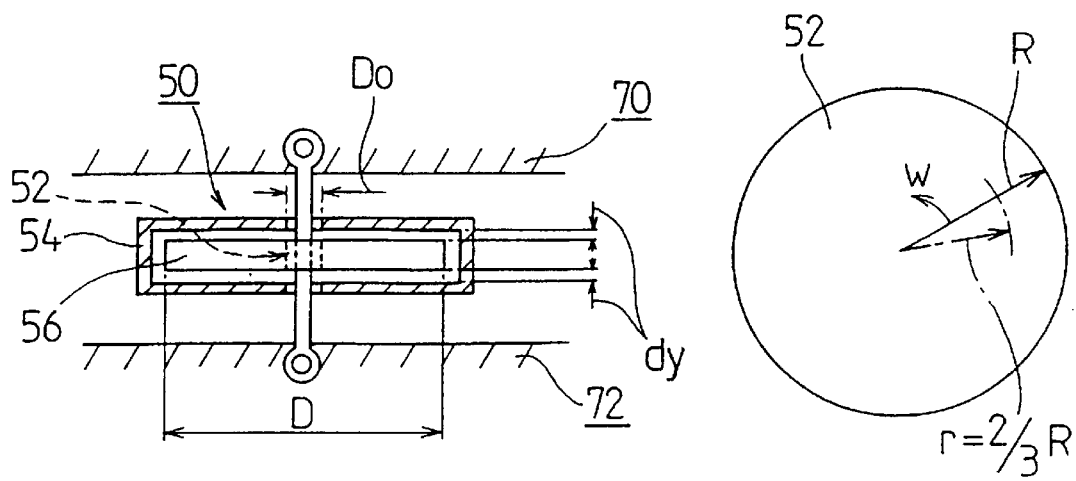
FIG. 17 is a schematic view, wherein a damping top in accordance with the present invention is placed on the foundation to support the building construction.

The damping effect of the damping device in accordance with the present invention will be described in detail. The damping top 50 is placed on a foundation 71 to support a building construction 70 (in FIG. 17).

Predominant (fundamental) frequency of the building construction: n (Hz)

Deformation (maximum) in axial direction of the damping (damping) top 50: d (cm)

Screw pitch of the guide screw and the nut 52: p (cm)

Rotation in a half-period $\Delta t(=\frac{1}{2}n)$: m=d/p

Rotational frequency (per 1 sec.) of the rotational top 56: f=2dn/p

Diameter (radius) of the rotational top 56: D (radius R=D/2)

Area of the rotational top 56: top face

; Atop=$\pi(D^2-D0^2)/4$

; Abottom=90 $(D^2-D0^2)/4$

; Atotal=$\pi D^2/4 (D^0 \text{is ignored})$

Angular rate$\omega$(rad./sec.) of the rotational top 56 is given by the following equation (1).

$$\omega = 2\pi f = 4\pi dn/p \tag{1}$$

Representative velocity v(m/sec) of the rotational top 56 is given by;

$$V = 2\pi fr = 4 dnr/p \text{ (r is the representative radius)}$$

Assuming that r=⅔R (=D/3), "v" is represented by the following equation (2).

$$V = 4\pi dnD/3p \tag{2}$$

In such the damping top, the damping force Qd (kg) of the viscous material is generally given by the following equation (3).

$$Qd = a\mu (dv/dy)^\alpha A \tag{3}$$

where

"a": coefficient

"$\mu$": viscosity of the viscous material (kg sec/cm²)

"dv": difference in velocity between two faces (inner face of the chamber 54 and surface of the rotational top 56)

"dy": gap (cm) between two faces (inner face of the chamber 54 and swrace of the rotational top 56)

"A": confronting area between two faces (inner face of the chamber 54 and surface of the rotational top 56).

The damping force per a unit gap (1 cm) is calculated from the following equation (4) which is obtained by incorporating the equation (2) into the equation (3).

$$Qd = a\ \mu A (4\pi dnD/3p)^\alpha \pi D^2/2 \tag{4}$$

As an experimental result, the following approximated values have been obtained.

"a": 0.0843 $(\mu 30)^{-0.483}$($\mu$30 is the viscosity of the viscous material at a temperature of 30° C.).

"$\mu$": 7.1$(\mu 30)^{0.88} e^{-0.07t}$ (t is the temperature)

"$\alpha$": 0.94

As the simplified relational equation, the following equation (5) has been obtained.

$$Qd = 0.6 f^{\{1.17(\mu 30)0.3\}} (\mu 30)^{0.4} \times e^{-0.7t} A(v/dy)^{0.94} \tag{5}$$

From the above equations (1) and (2), the following relationships are obtained.

A=$\pi D^2/2$

V=4$\pi$dnD/3p

Assuming that:

n=1.0 Hz;

d=5 cm;

p=0.5 cm;

D=40 cm;

dy=1 cm, then f=2dn/p=2 5 1/0.5=20(rps);

A=$\pi D^2/2$=about 2500 (cm²);

V=4$\pi$dnD/3p=4$\pi$5 1 40/3 0.5=1670 (cm/sec); and for the used viscous material, $\mu 30$=100 poise=1/9.8×10³ (kg sec/cm²), the above damping force Qd is calculated from the above equation (5) as follows.

$$Qd=0.6\times20^{\{-1.17(1/9800)0.3\}}(1/9.8\times10^3)^{0.4}\times e^{-0.07\times20}A(v/dy)0.94$$

$$=0.6\times0.8\times0.253\times0.2466\times2500\times(1670)^{0.94}$$

$$=8010 \text{ (kg)}$$

Such the damping top uses the small flat rotational top 56 of 40 cm in diameter to obtain a large damping force of about 8 tons.

The damping top in accordance with the present invention has such a simple and compact structure as to convert a linear displacement of the screw portion into a rotational motion of the rotational top and which is shortened in a longitudinal direction, and an extremely large damping effect can easily be achieved as compared to the conventional device. Further, it is advantageous that this damping top is applied to a relatively large building and also to a small prefabricated structure, as well as applicable to both compressive and tensile loads.

Figure 2:
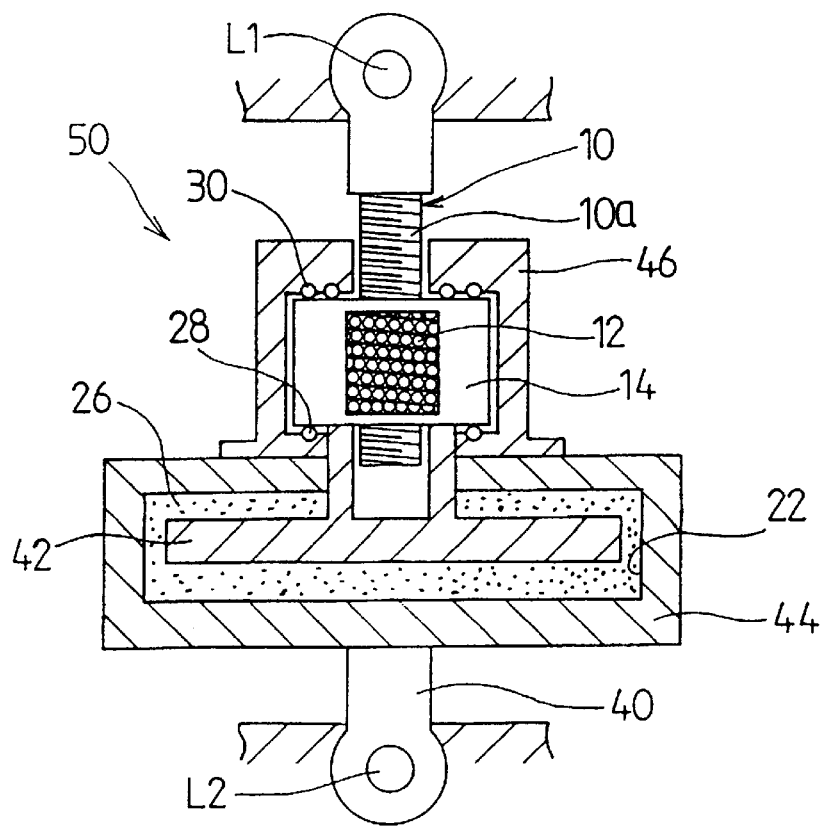
FIG. 2 is a cross sectional view illustrative of a damping device having a damping top in a first modification in accordance with the present invention.

The above damping top in accordance with the present invention may variously be modified, for example, as shown in FIG. 2. The first connective member is changed from the tube rod 20 into a normal rod 40. The rotational top is also changed from the unitary formed rotor 16 into a separate rotor 42 extending in parallel to a radial direction and separated from one side of the guide nut 14. The separate rotor 42 is accommodated in a chamber 22 in a first casing formed in a connective side of the rod 40 (the second connective member). The guide nut 14 is axially supported through ball bearings 28 and 30 in a second casing 44. It is apparent that in this modification, the same functions and effects as the above embodiment are exhibited.

Figure 3:
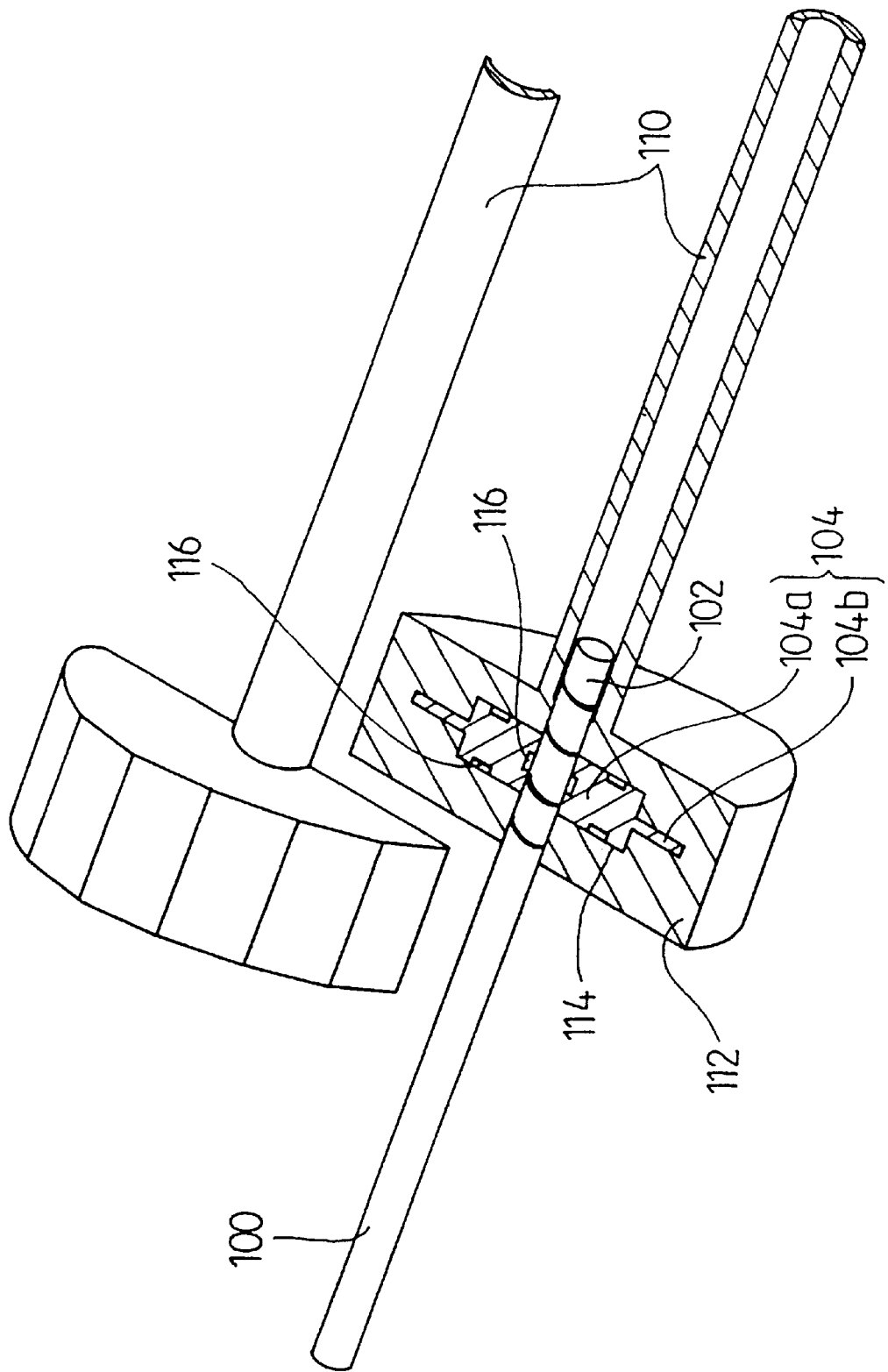
FIG. 3 is a cross sectional view illustrative of a damping device having a damping top in a second modification in accordance with the present invention.

As a further modification in FIG. 3, the damping device comprises first and second connective members so connected to each other as to be relatively displaceable from each other. This first connective member comprises an inner tube 100 formed with a guide screw 102 in its connective side, and a disk-shaped rotor engaged with this screw and having a sufficiently larger diameter than the inner tube 100 as well as provided rotatably and slidably on the guide screw in accordance with a relative displacement from the screw 102. The rotor 104 comprises a disk-shaped body 104a and a brimmed portion 104b extending radially from a circumference of the disk-shaped body 104a and being formed thinner than the disk-shaped body 104a. The second connective member comprises an outer tube 110 and a cylindrically shaped casing 112 formed in its connective side for accommodating the rotor 104. Further, the rotor 104 is so supported rotatably and slidably through plural ball bearings 116 A viscous material and/or viscoelastic material 114 for damping is filled into the gap between the inner wall of the cylindrically shaped casing 112 and the rotor 104. It is also apparent that in this modification, the same function and effect as the above embodiment can be exhibited.

The damping top in accordance with the present invention is as described above widely applied to a large building and a small prefabricated structure, for which reason a whole stricture may be optional in response to the usage. In the damping top shown in FIG. 4, the one connective member 50b comprises a longitudinal connective member 50b. In the damping device 50 shown in FIG. 5, te one connective member 50b is connected with an extending member 50c. In the damping device 50 shown in FIG. 6, the one connective member 50a comprises an inserting connective member 50a and other connective member 50b is held rotatably in a holding portion d.

Figure 4:
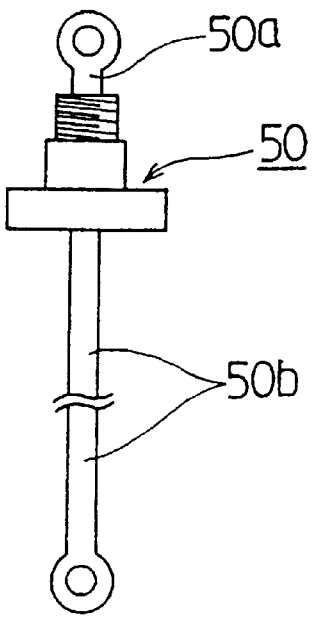
FIG. 4 is a side view illustrative of a damping device having a damping top with one structure in accordance with the present invention.
Figure 7:
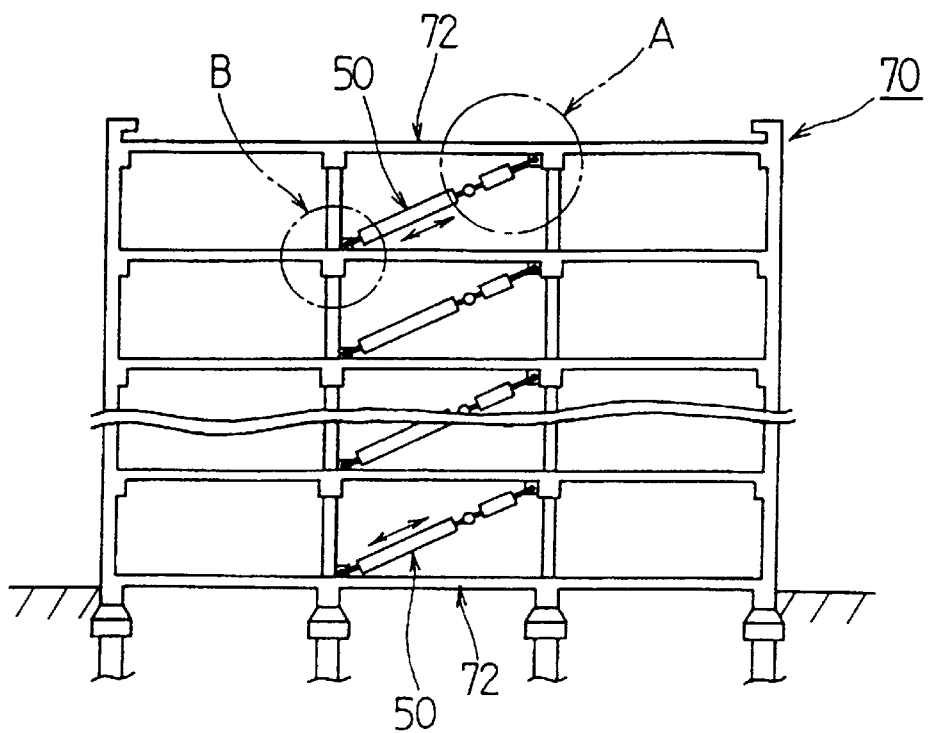
FIG. 7 is a whole sectional view illustrative of a building construction, wherein a damping device in accordance with the present invention is applied between diagonally opposite corners of the frame structure of the building construction.
Figure 8:
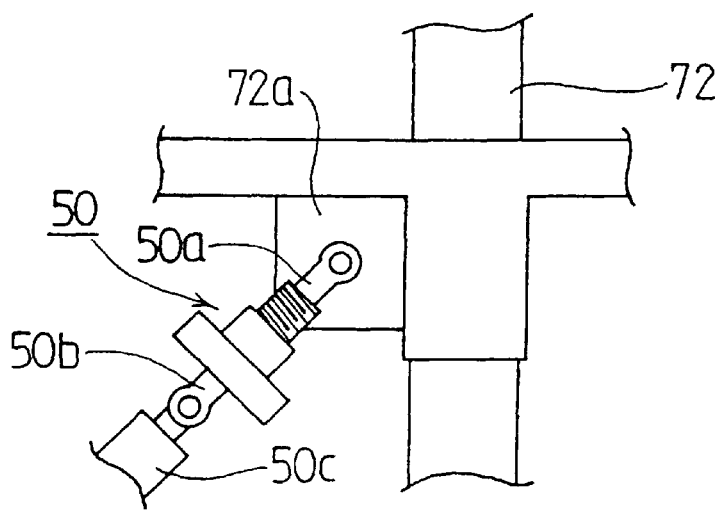
FIG. 8 is an enlarged view at an "A" portion of FIG. 7.
Figure 9:
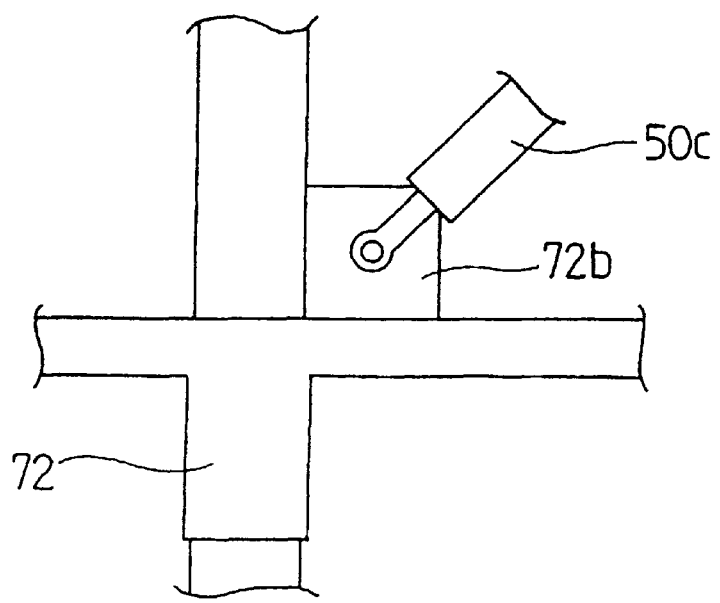
FIG. 9 is an enlarged view at a "B" portion of FIG. 7.
Figure 10:
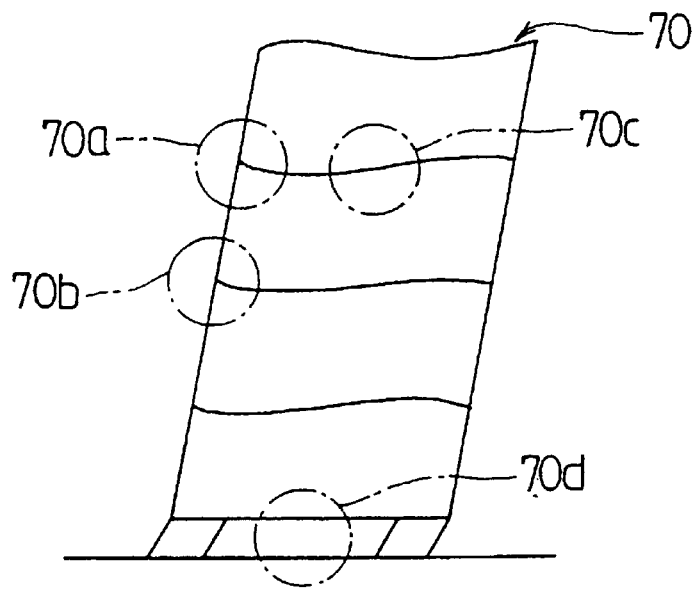
FIG. 10 is a whole sectional view illustrative of a fair-faced construction, wherein a damping device in accordance with the present invention is applied at sites 70*a,* 70*b,* 70*c* and 70*d* between precast members of the concrete and/or the fair-faced construction.
Figure 11:
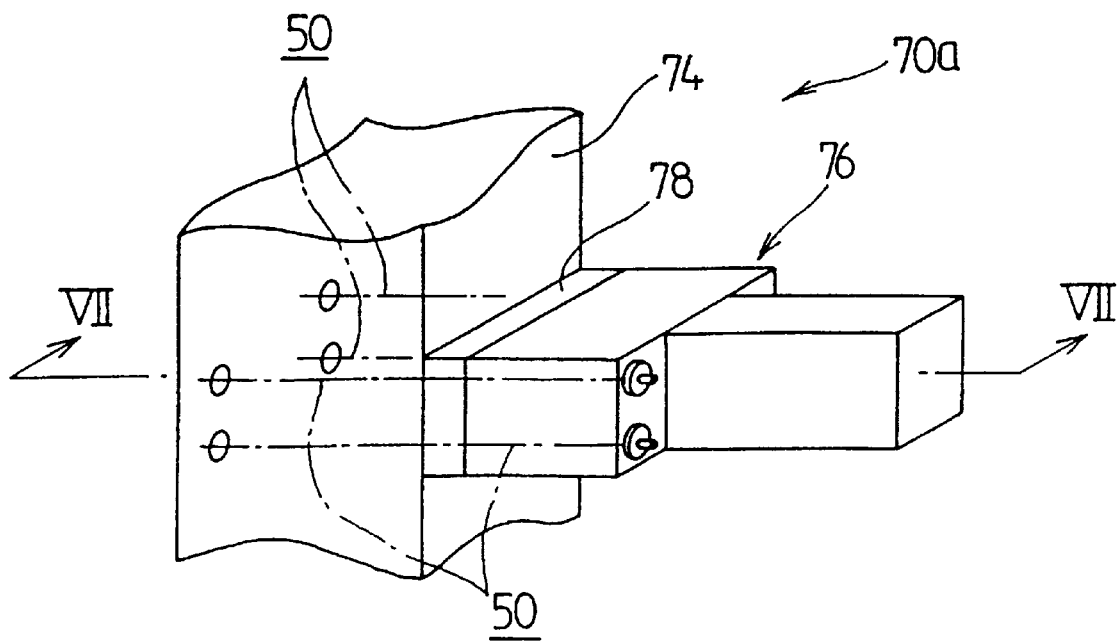
FIG. 11 is a perspective view illustrative of a damping device using a damping top applied to the site 70*a* in FIG. 10.
Figure 12:
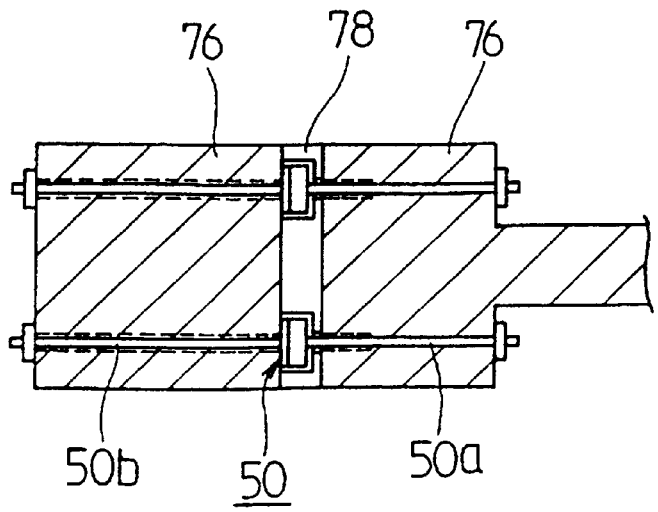
FIG. 12 is a cross sectional view taken along a VII—VII line of FIG. 11.

The embodiment of the damping device using the damping top having such structure in accordance with the present invention, particularly the embodiment for application to the building construction, will hereinafter be described in detail. In FIG. 7, the damping device shown in FIG. 4 is used. The damping top 50 is provided through connecting members 50a and 50b and also through an extension member 50c between attached plates 72a and 72b at diagonally opposite comers of a frame structure 72 in a building construction 70 so that the damping top 50 is allowed to be compressed and tensed. Accordingly, the damping effect by the damping top 50 expandable by a displacement due to strain to the frame structure 74 generated by earthquakes does absorb a strain energy of the frame structure 74, whereby an effective damping to the vibration of the building construction 70 can be obtained In FIG. 10, the damping tops 50 may be provided so as allowed to be compressed and tensed individual sites 70a, 70b, 70c and 70d (to be described below individually) between precasts and/or fair-faced structure in the fair-faced construction including precast members of concrete. In FIGS. 11 and 12 relating to the site 70, the damping top 50 is provided in a filler 78 between a precast column 74 and a precast beam 76. End portions of the connective members 50a and 50b individually penetrating through both the above members 50a and 50b (loosely engaged in at least one side 50b) are engaged by nuts with end portions of the both members 50a and 50b. Accordingly, the damping effect by the damping top 50 expandable due to relative displacement between the both members 50a and 50b generated by earthquakes does absorb a relative displacement energy of the both members 50a and 50b, whereby an effective damping to the vibration of the building construction 70 can be obtained.

Figure 5:
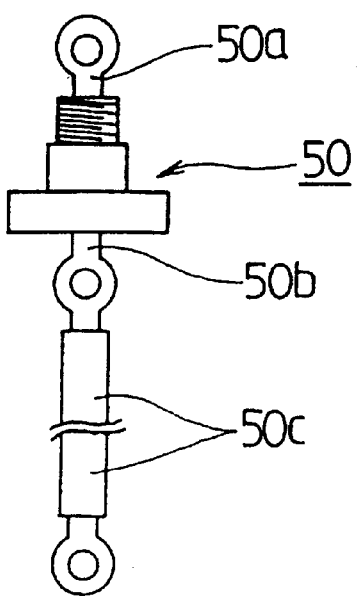
FIG. 5 is a side view illustrative of a damping device having a damping top with another structure in accordance with the present invention.
Figure 6:
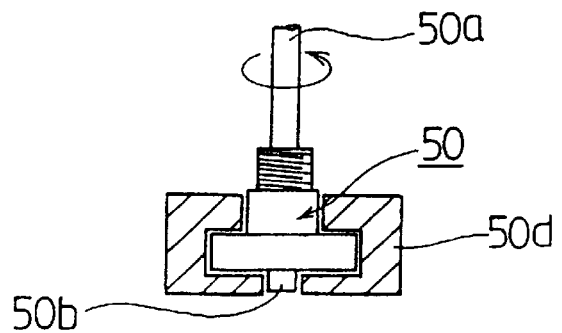
FIG. 6 is a side view illustrative of a damping device having a damping top with further another structure in accordance with the present invention.
Figure 13:
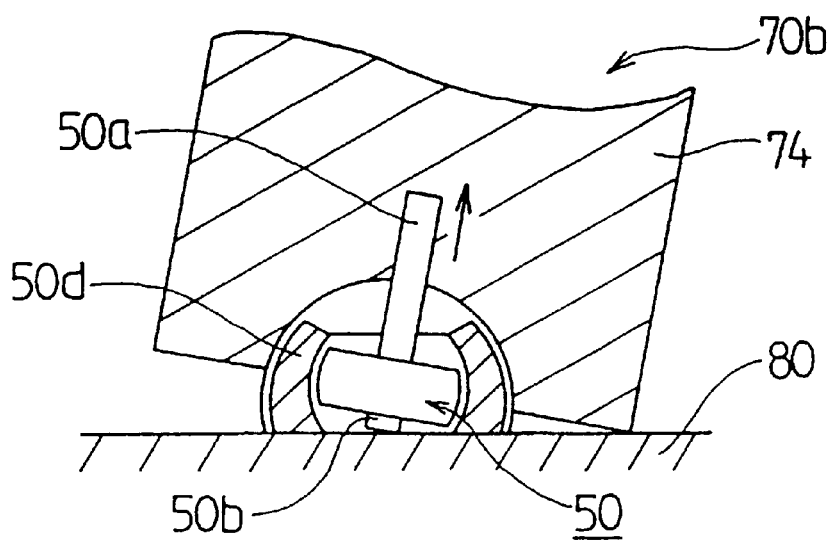
FIG. 13 is a cross sectional view illustrative of a damping device using a damping top applied to the site 70*b* in FIG. 10.

In FIG. 13 relative to the site 70b, the damping top 50 shown in FIG. 5 is used. This damping top is provided between a precast column 74 and a fair-faced construction 80. The one side connective member 50a is buried in the column 74 whilst the other connective member 50b is rotatably held by a holder 50d fixed to a floor 80. Accordingly, the damping effect by the damping top 50 expandable through extension and restoration due to relative displacement between the column 74 and the floor 80 generated by earthquakes does absorb a relative displacement energy of the column 74 and the floor 80, whereby an effective damping to the vibration of the building construction 70 can be obtained.

Figure 14:
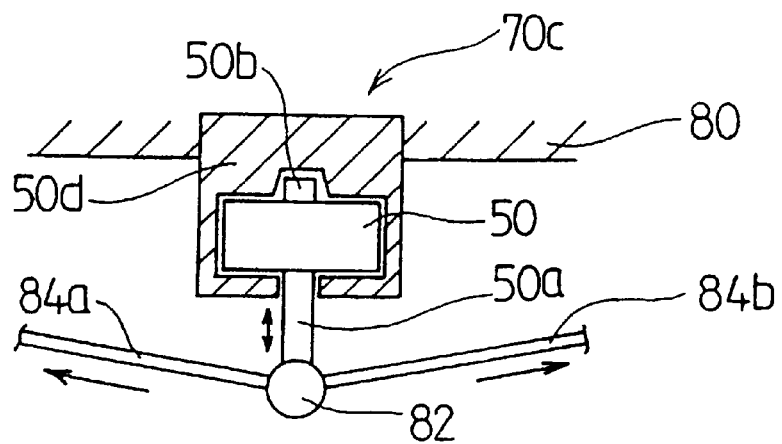
FIG. 14 is a cross sectional view illustrative of a damping device using a damping top applied to the site 70*c* in FIG. 10.

In FIG. 14 relative to the site 70c, the damping top 50 including precast connective members 50b and 50a is entirely fixed through a holder 50d into a fair-faced construction 80. The top of the one side connective member 50a is connected with a supporter 82 and also connected through both supporting rods 84a and 84b to predetermined sites of the floor 80. Accordingly, the damping effect by the damping top 50 expandable through extension and restoration due to relative displacement the floor 80 itself generated by earthquakes does absorb a relative displacement energy of the floor 80, whereby an effective damping to the vibration of the building construction 70 can be obtained.

Figure 15:
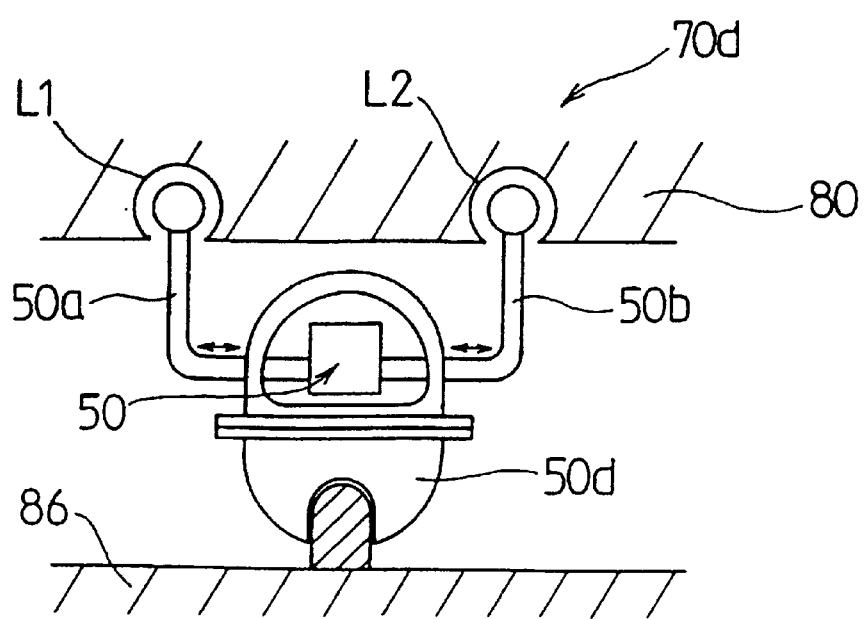
FIG. 15 is a cross sectional view illustrative of a damping device using a damping top applied to the site 70*d* in FIG. 10.

FIG. 15 relative to the site 70d, the damping top 50 is provided between a foundation 86 and a fair-faced construction 80 through a holder 50d over a building construction foundation 86, and its both connective members 50b and 50a arc connected to predetermined positions L1 and L2 respectively in the floor 80. Accordingly, the damping effect by the damping top 50 expandable due to a relative displacement in horizontal direction between the foundation 86 and the floor 80 generated by earthquakes does absorb a relative displacement energy in horizontal direction between the foundation 86 and the floor 80, whereby an effective damping to the vibration of the building construction 70 can be obtained.

Figure 16:
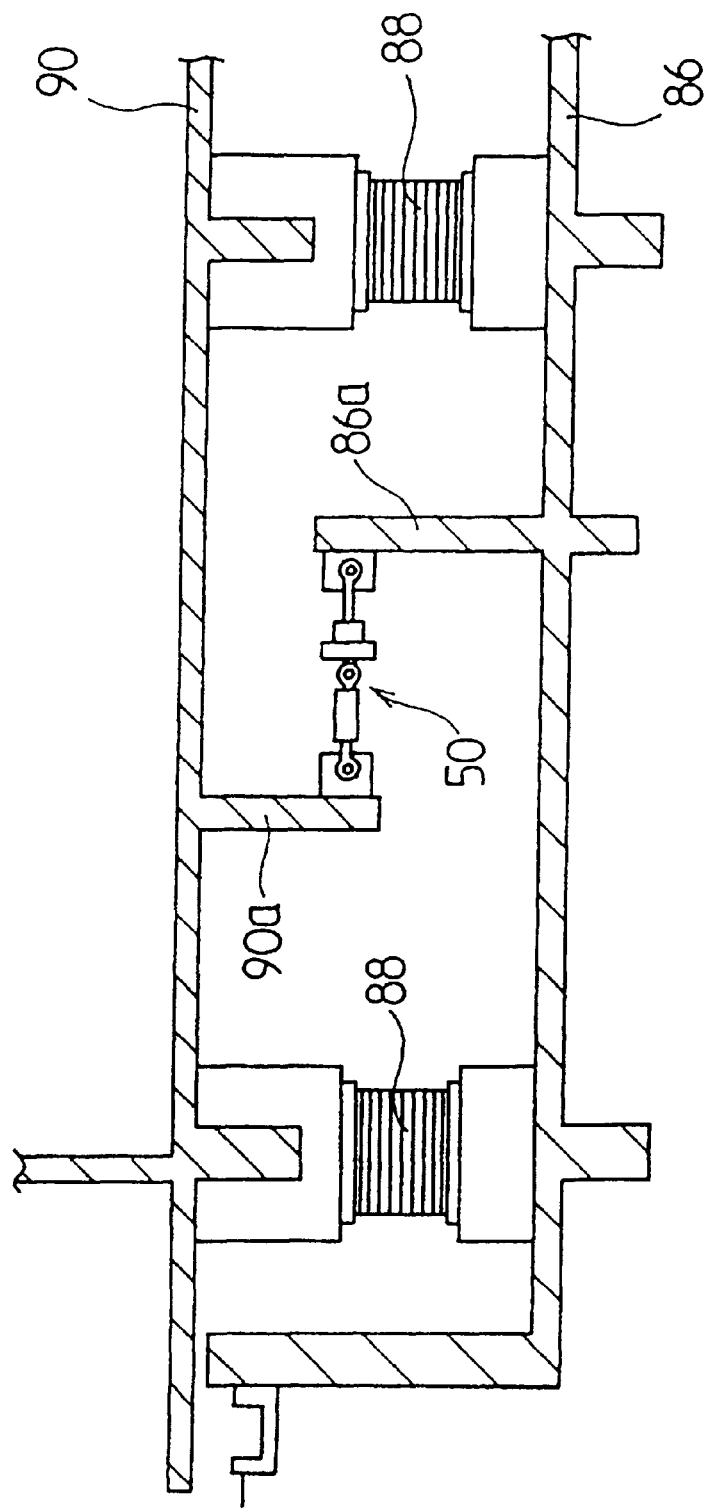
FIG. 16 is a whole cross sectional view of illustrative of a foundation and a vibration isolation construction, wherein a damping device in accordance with the present invention is applied between the foundation and the vibration isolation construction over this foundation.

In FIG. 16, the damping top 50 is provided through supporting columns 86a and 90a between a foundation 86 and a vibration isolation construction 90 supported through aseismic base isolation pads 88 over the foundation 86, so that the damping top 50 is allowed to be compressed and tensed. Accordingly, the damping effect by the damping top 50 expandable due to a relative displacement in horizontal direction between the foundation 86 and the vibration isolation construction 90 generated by earthquakes does absorb a relative displacement energy in horizontal direction between the foundation 86 and the vibration isolation construction 90, whereby an effective damping to the vibration of the building construction 70 can be obtained.

Figure 18:
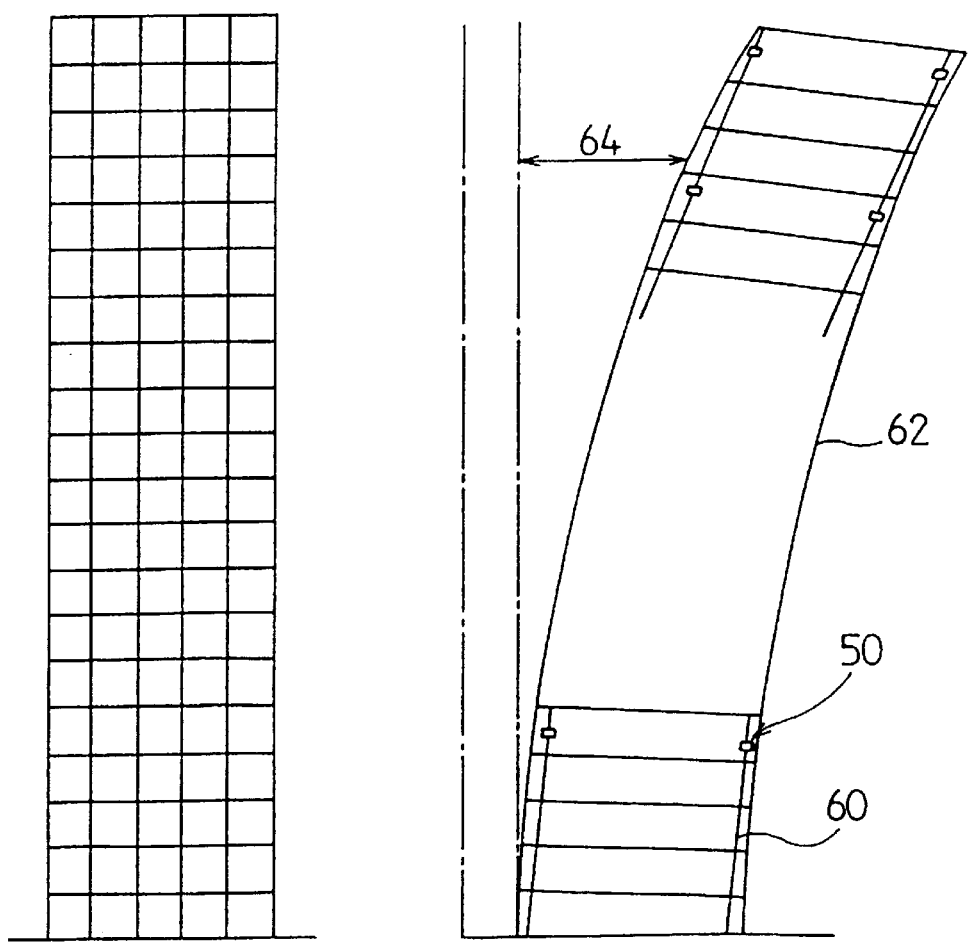
FIG. 18 is a schematic view, wherein a damping top in accordance with the present invention is placed to suppress a bending deformation of a high-rise building construction on the foundation to support the building construction.

As shown in FIG. 18, the damping top may be used for a damping construction method to bending deformation 64 of the high-rise building or the super high-rise building. For the high-rise building or the super high-rise building, the bending deformation is more important than shear deformation. In order to suppress this bending deformation, it is necessary to improve a bending deformation damping property of columns extending in a vertical direction of the building. It is, however, difficult to suppress vertical micro-fluctuations, for which reason it is necessary to increase the vertical microflucttiation for suppressing the bending deformation. For example, as illustrated in FIG. 18, isolated floors of the high-rise building or the super high-rise building are connected through slender members such as precast (PC) steel wires 60 or PC steel in combination with the damping top in accordance with the present invention, so as to increase the vertical micro-fluctuation for suppressing the bending deformation. The slender member such as the PC steel wires as the connective members is more effective to the tension. It is preferable to place the above device in the vicinity of the outermost vertical columns of the building, but it is also possible to provide the same at an interior of the building or an exterior of the building or within the columns. The above device may be provided to connect floors isolated by two or three floors. In a building structure, the device may be provided to connect the highest floor and the ground.

Figure 19:
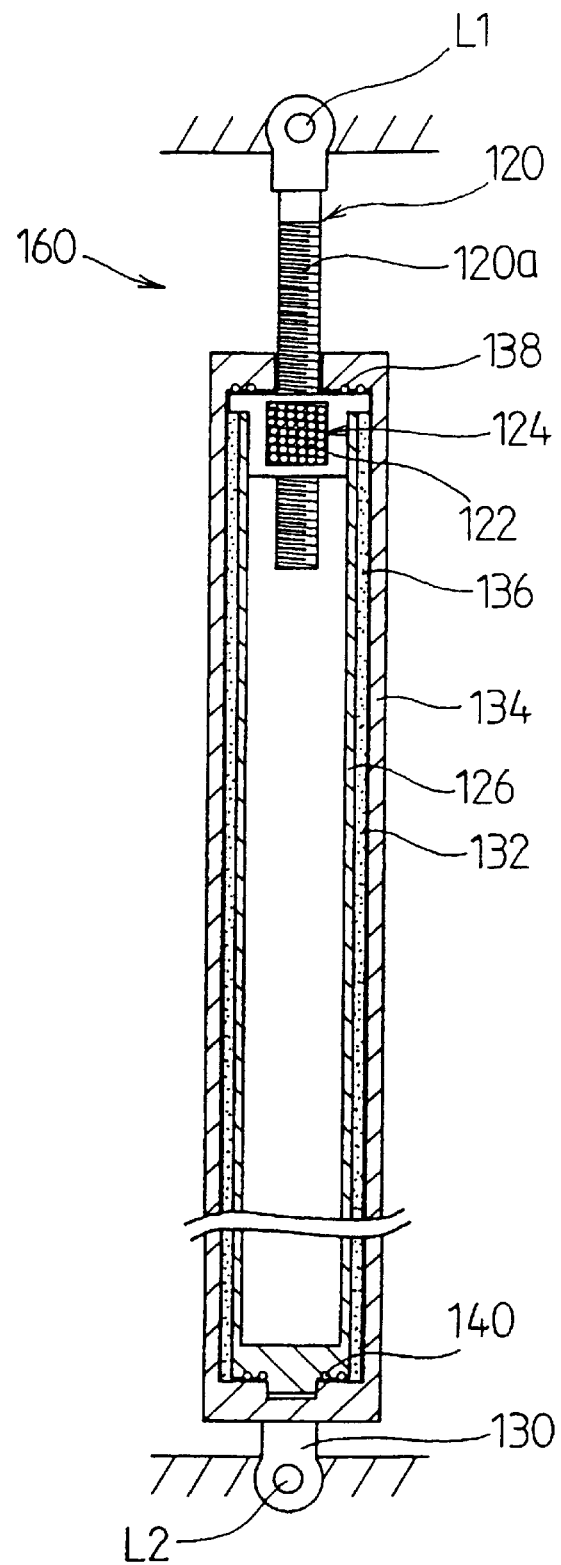
FIG. 19 is a cross sectional view illustrative of a damping device (damping rod) in one embodiment in accordance with the present invention.

The damping rod of the first embodiment in accordance with the present invention will hereinafter be described with reverence to the attached drawings. In FIG. 19, the damping rod 160 in accordance with the present invention comprises first and second connective members 160 and 130 so coupled with each other as to connect two points (objects) L1 and L2 relatively displacing from one another. The individual ends of the both connective members 120 and 130 are fixed to the two points L1 and L2 respectively. The first connective member 120 has a connective part formed of a screw portion 120a on which a rotational inner cylinder 126 driven by a guide nut 124 engaged through ball bearings 122 thereto is rotatably and slidably provided. The second connective member 130 is in the form of a fixed outer cylinder 134 for a chamber 132 accommodating the rotational inner cylinder 126, so that a damping viscous material and/or viscoelastic material 26 is filled in this chamber 132.

The rotational inner cylinder 126 comprises a cylinder having one end engaged with the guide nut 124 and opposite end being closed. Ball bearings 138 and 140 are provided on both top face of the guide nut 134 and bottom face of the closing end of the rotational inner cylinder 126 adjacent to the fixed outer cylinder 134, whereby the rotational inner cylinder 126 is axially supported so as to rotate on the guide screw portion 120a and slides in top and down directions in response to both compressive and tensile loads generated by a relative displacement between the two points Li and L2. Synthesized rubbers such as polyisobutylene may preferably be used as viscous fluid.

The damping effect of the damping device in accordance with the present invention will be described in detail. The damping device 160 is placed between two points Li and 12 of the building construction 70 (in FIGS. 25–26).

Predominant (fundamental) frequency of the building construction: n (Hz)

Deformation (maximum) in axial direction of the damping (damping) rod 160: d (nm)

Screw pitch of the guide screw and the nut 162; p (cm)

Rotation in a half-period $\Delta t(=\frac{1}{2}n)$: m=d/p

Rotational frequency (per 1 sec.) of the rotational inner cylinder 166; f=2dn/p

Diameter (radius) of the rotational inner cylinder 166: D

Length of the rotational inner cylinder 166: L

Surface area of the rotational inner cylinder 166 : A=πDL

Angular rate ω(rad./sec.) of the rotational inner cylinder 166 is given by the following equation (1).

$$\omega = 2\pi f = 4\pi dn/p \tag{1}$$

Circumferential velocity v(m/sec) of the rotational inner cylinder 166 is given by:

$$V = 2\pi dnD/p \tag{2}$$

In such the damping device, the damping force Qd (kg) of the viscous material is generally given by the following equation (3).

$$Qd = a\mu(dv/dy)^\alpha A \tag{3}$$

where

"a": coefficient

"$\mu$": viscosity of the viscous material (kg sec/cm$^2$)

"dv": difference in velocity between two faces (inner face of the fixed outer cylinder 166 and outer face of the rotational inner cylinder 164)

"dy": gap (cm) between two faces (inner face of the fixed outer cylinder 166 and outer face of the rotational inner cylinder 164)

"A": confronting area between two faces (inner face of the fixed outer cylinder 166 and outer face of the rotational inner cylinder 164).

The damping force per a unit gap (1 cm) is calculated from the following equation (4) which is obtained by incorporating the equation (2) into the equation (3).

$$Qd = a\mu A(4\pi dnD/p)^\alpha \tag{4}$$

As an experimental result, the following approximated values have been obtained.

"a": $0.0843(\mu 30)^{-0.483}$ ($\mu 30$ is the viscosity of the viscous material at a temperature of 30° C.).

"$\mu$": $7.1(\mu 30)^{0.88} e^{-0.07t}$ (t is the temperature)

"$\alpha$": 0.94

As the simplified relational equation, the following equation (5) has been obtained.

$$Qd = 0.6 f^{\{-1.17(\mu 30)0.3\}}(\mu 30)^{0.4} \times e^{-0.07t} A(v/dy)^{0.94} \tag{5}$$

From the above equations (1) and (2), the following relationships are obtained.

Assuming that:

n=1.0 Hz;

d=5 cm;

p=0 cm;

D=40 cm;

dy=1 cm;

$\mu 30$=100 poise 1/(9.8×10³)(kg sec/cm²); and t=20(° C.), then f=2dn/p=2×5×1/0.5=20(rps);

A=$\pi$DL=$\pi$×10×100=3142(cm²);

V=2$\pi$dnD/p=2×$\pi$5×1×10/0.5=628 (cm/sec); and the above damping force Qd is calculated from the above equation (5) as follows.

$$Qd=0.6\times 20^{\{-1.17(1/9800)^{0.3}\}}(1/9800)^{0.4}\times e^{-0.07\times 20}\times 3142\times (628/1)^{0.94}$$

$$=0.6\times 0.8\times 0.0253\times 0.2466\times 3142\times (328)^{0.94}$$

$$=2180 (kg)$$

Such the damping device uses the rotational inner slender cylinder 166 of 10 cm in diameter and 100 cm in length to obtain a large damping force of about 2.2 tons.

Assuming only a linear displacement, and if the velocity v' (cm/sec) of the rotational inner cylinder 166 is given by $$V'=d/2n=5/2\ 1=2.5 (cm/sec), then$$

the above damping force Qd is calculated similarly to the above equation (5) as follows.

$$Qd'=0.6\times 1\times (1/9800)^{0.4}\times e^{-0.07\times 20}\times 3142\times (2.5)^{0.94}$$

$$=0.6\times 0.0253\times 0.2466\times 3142\times 2.4$$

$$=27.8\ (kg)$$

As compared to the above damping force Qd, the above damping force is about 78 times of this damping force Qd' if the liner displacement only appears.

In accordance with the present invention, the damping device has a simple and compact structure for converting the liner displacement of the screw portion into the rotational motion of the rotational inner cylinder (particularly extending along the longitudinal direction), and an extremely large damping effect can easily be achieved as compared to the conventional device. Further, it is advantageous that this damping device is applied to a relatively large building and also to a small prefabricated structure, as well as applicable to both compressive and tensile loads.

Figure 20:
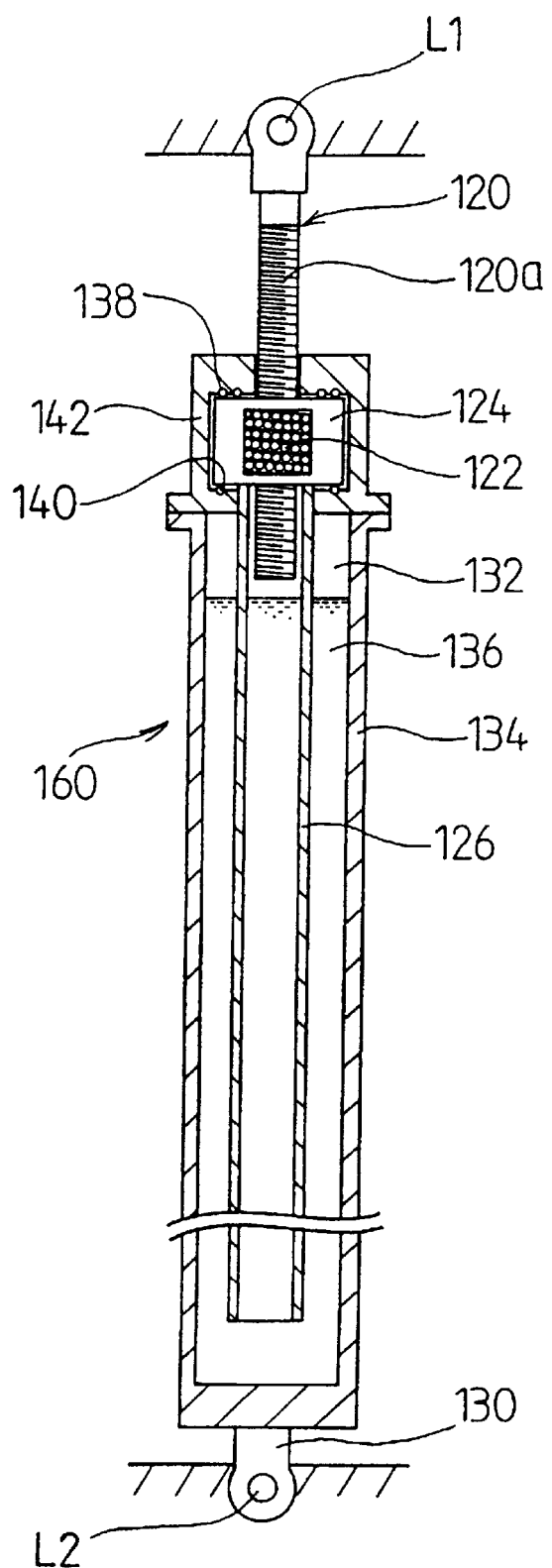
FIG. 20 is a cross sectional view illustrative of a damping device (damping rod) in another embodiment in accordance with the present invention.

The above damping device in accordance with the present invention may variously be modified, for example, as shown in FIG. 20. In this modification to the embodiment of FIG. 19, the rotational inner cylinder 126 is in the form of opening cylinder and also the guide nut 124 is axially supported through ball bearings 138 and 140 to the casing 142 fixed to the fixed outer cylinder 134. It is apparent that, in this embodiment, also the same functions and effects as in the above embodiment are exhibited. As also described above, the above damping device of the present invention, is applied to a relatively large building and also to a small prefabricated structure.

The embodiment of the damping device using the damping rod in accordance with the present invention will hereinafter be described in detail. In FIG. 21, the damping rod 160 is provided through connecting members 170a and 170b and also through connecting members 160a and 160b at diagonally opposite corners of a frame structure 174 in a building construction 172 so that the damping rod 160 is allowed to be compressed and tensed. Accordingly, the damping effect by the damping rod 160 expandable by a strain displacement due to strain to the frame structure 74 generated by earthquakes does absorb a strain energy of the frame structure 174, whereby an effective damping to the vibration of the building construction 172 can be obtained.

In FIG. 24, the damping device 160 is provided through supporting columns 176a and 180a between a foundation 176 and a vibration isolation construction 180 supported through aseismic base isolation pads 178, 178 over the foundation 176, so that the damping device 160 is allowed to be compressed and tensed. Accordingly, the damping effect by the damping device 160 expandable due to a relative displacement in horizontal direction between the foundation 176 and the vibration isolation construction 180 generated by earthquakes does absorb a relative displacement energy in horizontal direction between the foundation 86 and the vibration isolation construction 80, whereby an effective damping to the vibration of the building construction 80 can be obtained. In accordance with the damping devices of the present invention, the damping top and the damping rod are simply and compactly structured and exhibit sufficiently large damping effects.

Whereas preferred embodiments of the present invention have been described, it is possible to do many improvements and modifications which fall within the spirit and scope of the present invention without limitation to the above embodiments. For example, it is possible to change the ball bearings into other supporting means optionally Industrial Applicability As described above, a damping top in accordance with the present invention comprises first and second connective members so connected with each other as to be relatively displaceable, and individual one ends of the connective members are fixed to the above two points respectively, and the first connective member is formed with a guide screw in its connecting side, a guide nut engaged with said guide screw and axially supported, whilst the second connective member further is formed of a cylindrically shaped casing in its connecting side for accommodating the rotational top, and a viscous material and/or a viscoelastic material is filled in the chamber so that the damping mechanism converts the liner displacement of the screw portion into the rotational motion of the rotational top.

The damping rod in accordance with the present invention comprises first and second connective members so coupled with each other, and the first connective member further comprises a first rod formed with a guide screw at least in its connecting side, a guide nut engaged with the guide screw and axially supported so as to rotate and slide on the guide screw on the basis of a relative displacement from the guide screw, and a cylindrically shaped rotational body having a sufficiently larger diameter than the first rod and having a sufficiently larger length in axial direction than a diameter itself and further being rotatably and slidably attached thereto through the guide nut, whilst the second connective member further comprises a cylindrically shaped casing formed in its connecting side for accommodating the cylindrically shaped rotational body and the guide nut, wherein a viscous material and/or a viscoelastic material is filled for damping in a gap defined between an inner wall of the cylindrically shaped casing and the cylindrically shaped rotational body.

A displacement conversion magnification (relative velocity increase rate) is more largely increased as compared to the conventional device. In accordance with the damping device of the present invention allows the simple and compact structure to achieve easily the large damping effect.

The above damping devices in accordance with the present invention are simply and compactly structured exhibiting the sufficient damping effects as described in the damping top and the damping rod, for which reason similarly to the damping top and the damping rod, the damping device may be simply and compactly structured and exhibits the sufficient damping effect.

What is claimed is:

1. A damping device comprising: first and second connective members so connected with each other as to be relatively displaceable; said first connective member further comprising a first rod formed with a guide screw in its connecting side, a guide nut engaged with said guide screw and axially supported so as to rotate and slide on said guide screw on the basis of a relative displacement from the guide screw, and a disk-shaped rotational body having a sufficiently larger diameter than said first rod and being rotatably and slidably attached thereto through said guide nut; said second connective member further comprising a second rod, and a cylindrically shaped casing formed in its connecting side for accommodating said rotational body and said guide nut, said damping device comprising at least one selected from the group consisting of a viscous material and a viscoelastic material is filled for damping in a gap defined between an inner wall of said cylindrically shaped casing and said rotational body.

2. The damping device as claimed in claim 1, wherein said rotational body is so unitary formed as to extend radially and outwardly from a circumference of said guide nut.

3. The damping device as claimed in claim 1, wherein said rotational body is provided at a position distanced in an axial direction from said guide nut and also is so formed as to be engaged with one side of said guide nut.

4. A method of using a damping device, wherein said damping device comprises first and second connective members so connected with each other as to be relatively displaceable, said first connective member further comprising a first rod formed with a guide screw in its connecting side, a guide nut engaged with said guide screw and axially supported so as to rotate and slide on said guide screw on the basis of a relative displacement from the guide screw, and a disk-shaped rotational body having a sufficiently larger diameter than said first rod and being rotatably and slidably attached thereto through said guide nut; said second connective member further comprising a second rod, and a cylindrically shaped casing formed in its connecting side for accommodating said rotational body and said guide nut, said damping device further comprising at least one selected from the group consisting of a viscous material and a viscoelastic material is filled for damping a gap defined between an inner wall of said cylindrically shaped casing and said rotational body, the method comprising:

providing said damping device between at least one selected from the group consisting of precast members and fair-faced constructions in a fair-face building constriction including precasts of concrete, so that said damping device is allowed to be compressed and tensed.

5. The method of claim 4, wherein said damping device is provided between a precast column and a precast beam.

6. The method of claim 4, wherein said damping device is provided between a precast column and a fair-faced floor slab.

7. The method of claim 4, wherein said damping device is provided within a fair-faced floor slab.

8. The method of claim 4, wherein said damping device is provided between a foundation of a building construction and a fair-faced floor slab.

9. The method of claim 4, wherein said damping device is provided between a foundation and a vibration-isolating construction on said foundation, so that said damping device is allowed to be compressed and tensed.

10. A damping device comprising: first and second connective members so connected with each other as to be relatively displaceable; said first connective member further comprising an inner tube formed with a guide screw in its connecting side, and a disk-shaped rotational body engaged with said guide screw and having a sufficiently larger diameter than said inner tube and being attached thereto rotatably and slidably on the basis of a relative displacement from the guide screw; said second connective member further comprising an outer tube, and a cylindrically shaped casing formed in its connecting side for accommodating said rotational body, said damping device, comprising at least one selected from the group consisting of a viscous material and a viscoelastic material is filled for damping in a gap defined between an inner wall of said cylindrically shaped casing and said rotational body.

11. The damping device as claimed in claim 10, wherein said rotational body comprises a disk-shaped body and a brimmed part being thinner than said disk-shaped body and extending radially and outwardly from a circumference of said disk-shaped body.

12. A damping device comprising: first and second connective members so connected with each other as to be relatively displaceable; said first connective member further comprising a first rod formed with a guide screw at least in its connecting side, a guide nut engaged with said guide screw and axially supported so as to rotate and slide on said guide screw on the basis of a relative displacement from the guide screw, and a cylindrically shaped rotational body having a sufficiently larger diameter than said first rod and having a sufficiently larger length in axial direction than a diameter itself and further being rotatably and slidably attached thereto through said guide nut; said second connective member further comprising a cylindrically shaped casing formed in its connecting side for accommodating said cylindrically shaped rotational body and said guide nut, said damping device comprising a viscous material and a viscoelastic material is filled for damping in a gap defined between an inner wall of said cylindrically shaped casing and said cylindrically shaped rotational body.

13. The damping device as claimed in claim 12, wherein said cylindrically shaped rotational body comprises a cylinder having one end into which said guide nut is inserted and an opposite closed end, wherein one side of said guide nut and said opposite closed end of said are rotatably and axially supported.

14. The damping device as claimed in claim 12, wherein said cylindrically shaped rotational body comprises a tube-like rotational body having one end into which said guide nut is inserted and an opposite opened end, wherein opposite sides of said guide nut are rotatably and axially supported and further comprising at least one selected from the group consisting of said viscous material and said viscoelastic material is also filled into a hollow portion of said tube-like rotational body.

15. A method of using a damping device, wherein said damping device comprises first and second connective members so connected with each other as to be relatively displaceable; said first connective member further comprising a first rod formed with a guide screw in its connecting side, a guide nut engaged with said guide screw and axially supported so as to rotate and slide on said guide screw on the basis of a relative displacement from the guide screw, and a disk-shaped rotational body having a sufficiently larger diameter than said first rod and being rotatably and slidably attached thereto through said guide nut; said second connective member further comprising a second rod, and a cylindrically shaped casing formed in its connecting side for accommodating said rotational body and said guide nut, said damping device further comprising at least one selected from the group consisting of a viscous material and a viscoelastic material is filled for damping a gap defined between an inner wall of said cylindrically shaped casing and said rotational body, the method comprising providing said damping device between diagonally opposite corners of a frame structure in a building construction, so that said damping device is allowed to be compressed and tensed.

16. A method of using a damping device, wherein said damping device comprises first and second connective members so connected with each other as to be relatively displaceable; said first connective member further comprising a first rod formed with a guide screw in its connecting side, a guide nut engaged with said guide screw and axially supported so as to rotate and slide on said guide screw on the basis of a relative displacement from the guide screw, and a disk-shaped rotational body having a sufficiently larger diameter than said first rod and being rotatably and slidable attached thereto through said guide nit; said second connective member further comprising a second rod, and a cylindrically shaped casing formed in its connecting side for accommodating said rotational body and said guide nut, said damping device further comprising at least one selected from the group consisting of a viscous material and a viscoelastic material is filled for damping a gap defined between an inner wall of said cylindrically shaped casing and said rotational body, the method comprising:

providing said damping device to connect device isolated floors through a precast steel building extending throughout said isolated floors and also extending along an outermost vertical column of said building which comprises a plurality of floors.

17. A method for using a damping device, wherein said damping device. comprises first and second connective members so connected with each other as to be relatively displaceable; said first connective member further comprising an inner tube formed with a guide screw in its connecting side, and a disk-shaped rotational body engaged with said guide screw and having a sufficiently larger diameter than said inner tube and being attached thereto rotatably and slidably on the basis of a relative displacement from the guide screw; said second connective member further comprising an outer tube, and a cylindrically shaped casing formed in its connecting side for accommodating said rotational body, said damping device further comprising at least one selected from the group consisting of a viscous material and a viscoelastic material is filled for damping a gap defined between an inner wall of said cylindrically shaped casing and said rotational body, the method comprising:

providing said damping device to connect isolated floors through a precast steel building extending throughout said isolated floors and also extending along an outermost vertical column of said building which comprises a plurality of floors.

18. A method for using a damping device, wherein said damping device comprises first and second connective members so connected with each other as to be relatively displaceable; said first connective member further comprising a first rod formed with a guide screw at least in its connecting side, a guide nut engaged with said guide screw and axially supported so as to rotate and slide on said guide screw on the basis of a relative displacement from the guide screw, and a cylindrically shaped rotational body having a sufficiently larger diameter than said first rod and having a sufficiently larger length in axial direction than a diameter itself and further being rotatably and slidably attached thereto through said guide nut; said connective member further comprising a cylindrically shaped casing formed in its connecting side for accommodating said cylindrically shaped rotational body and said guide nut, said damping device further comprising at least one selected from the group consisting of a viscous material and a viscoelastic material is filled for damping a gap defined between an inner wall of said cylindrically shaped casing and said cylindrically shaped rotational body, the method comprising:

providing said damping device between diagonally opposite corners of a frame stricture in a building construction, so that said damping device is allowed to be compressed and tensed.

19. A method for using a damping device, wherein said damping device comprises first and second connective members so connected with each other as to be relatively displaceable; said first connective member further comprising a first rod formed with a guide screw at least in its connecting side, a guide nut engaged with said guide screw and axially supported so as to rotate and slide on said guide screw on the basis of a relative displacement from the guide screw, and a cylindrically shaped rotational body having a sufficiently larger diameter than said first rod and having a sufficiently larger length in axial direction than a diameter itself and further being rotatably and slidably attached thereto through said guide nut, said connective member further comprising a cylindrically shaped casing formed in its connecting side for accommodating said cylindrically shaped rotational body and said guide nut, said damping device further comprising at least one selected from the group consisting of a viscous material and a viscoelastic material is filled for damping a gap defined between an inner wall of said cylindrically shaped casing and said cylindrically shaped rotational body, the method comprising:

providing said damping device between a foundation and a vibration-isolating construction on said foundation, so that said damping device is allowed to be compressed and tensed.

* * * * *